(12) United States Patent
Tanaka et al.

(10) Patent No.: US 6,261,989 B1
(45) Date of Patent: Jul. 17, 2001

(54) CATALYTIC CONVERTER FOR CLEANING EXHAUST GAS

(75) Inventors: Hirohisa Tanaka; Isao Tan; Koji Yamada; Mari Yamamoto, all of Shiga; Shinji Matsuura; Yasunori Sato, both of Shizuoka, all of (JP)

(73) Assignees: Daihatsu Motor Co., Ltd., Osaka; Cataler Corporation, Shizuoka, both of (JP)

(*) Notice: Subject to any disclaimer, the term of this patent is extended or adjusted under 35 U.S.C. 154(b) by 0 days.

(21) Appl. No.: 09/314,200

(22) Filed: May 19, 1999

(51) Int. Cl.$^7$ .................. B01J 27/053; B01J 27/043; B01J 23/00; C08B 21/00; B21D 51/16

(52) U.S. Cl. .................. 502/217; 502/222; 502/223; 502/303; 502/304; 502/325; 502/328; 502/333; 502/339; 502/340; 502/341; 502/349; 502/350; 423/213.5; 423/215; 29/890

(58) Field of Search .................. 502/217, 222, 502/223, 304, 303, 325, 328, 333, 335, 339–341, 349, 350; 423/215, 213.5

(56) References Cited

U.S. PATENT DOCUMENTS

| | | | |
|---|---|---|---|
| 4,868,148 | * 9/1989 | Henk et al. | 502/303 |
| 5,008,090 | * 4/1991 | Joy, III et al. | 423/212 |
| 5,024,824 | * 6/1991 | Henk et al. | 423/213.5 |
| 5,057,483 | * 10/1991 | Wan | 502/304 |
| 5,130,109 | * 7/1992 | Wan | 423/213.2 |
| 5,139,992 | 8/1992 | Tauster et al. | 502/304 |
| 5,254,519 | * 10/1993 | Wan et al. | 502/252 |
| 5,336,476 | * 8/1994 | Kintaichi et al. | 423/239.1 |
| 5,462,905 | * 10/1995 | Nagami et al. | 502/232 |
| 5,490,977 | * 2/1996 | Wan et al. | 423/210 |
| 5,795,840 | * 8/1998 | Takami et al. | 502/327 |
| 5,837,642 | * 11/1998 | Tanaka et al. | 502/304 |
| 5,849,660 | * 12/1998 | Takemoto et al. | 502/327 |
| 5,888,464 | * 3/1999 | Wu et al. | 423/213.5 |
| 5,958,828 | * 9/1999 | Murakami et al. | 502/333 |

FOREIGN PATENT DOCUMENTS

| | | |
|---|---|---|
| 196 17 123 | 10/1996 | (DE) .................. B01D/53/88 |
| A-62-282641 | 12/1987 | (JP) . |
| A-63-77544 | 4/1988 | (JP) . |
| A-63-156545 | 6/1988 | (JP) . |
| A-2-43951 | 2/1990 | (JP) . |
| A-3-154635 | 7/1991 | (JP) . |
| A-4-284847 | 10/1992 | (JP) . |
| A-6-63403 | 3/1994 | (JP) . |

OTHER PUBLICATIONS

European Search Report dated Feb. 29, 2000 and Annex thereto.

* cited by examiner

Primary Examiner—Mark L. Bell
Assistant Examiner—Patricia L. Hailey
(74) Attorney, Agent, or Firm—Michael D. Bednarek; Shaw Pittman

(57) ABSTRACT

A catalytic converter for cleaning exhaust gas includes a heat-resistant support, and a catalytic coating formed on the heat-resistant support. The catalytic coating contains Pd-carrying particles of a cerium complex oxide, Pt & Rh-carrying particles of zirconium complex oxide, and particles of a heat-resistant inorganic oxide.

14 Claims, 2 Drawing Sheets

CATALYTIC CONVERTER FOR CLEANING EXHAUST GAS

BACKGROUND OF THE INVENTION

1. Field of the Invention

The present invention relates to a catalytic converter for effectively cleaning the exhaust gas of an automotive internal combustion engine by removal of nitrogen oxide ($NO_x$), carbon monoxide (CO) and hydrocarbons (HC).

2. Description of the Related Art

As is well known, the exhaust gas of an automotive internal combustion engine inevitably contains harmful substances such as $NO_x$, CO and HC. In recent years, particularly, the restrictions on exhaust gas cleaning are increasingly strict for environmental protection.

A so-called three-way catalytic converter has been most widely used for removing the above-described harmful substances. The three-way catalytic converter utilizes, as an active substance, a precious metal or metals such as Pt, Pd and/or Rh for reducing $NO_x$ to $N_2$ and for oxidizing CO and HC to $CO_2$ and $H_2O$. In this way, the three-way catalytic converter works as a catalyst both for oxidation and reduction.

Various researches have been made to improve the performance of a three-way catalytic converter. One of the three-way catalytic converters which have resulted from such researches utilizes cerium oxide ($CeO_2$) which has an oxygen-storing capacity (OSC); that is, the capacity to occlude gaseous oxygen in the crystalline structure and to release the occluded oxygen from the crystalline structure. More specifically, $CeO_2$ is added to a three-way catalytic converter for adjusting the oxygen concentration of gaseous atmosphere, so that excess oxygen in the gaseous atmosphere is occluded into the crystalline structure of $CeO_2$ in an oxygen-rich state for assisting the catalytic converter in reducing $NO_x$ to $N_2$ while releasing the occluded oxygen into the gaseous atmosphere in a CO- and/or HC-rich state for assisting the catalytic converter in oxidizing CO and HC to $CO_2$ and $H_2O$, respectively.

Meanwhile, there is an increasing demand for shifting the mounting location of the catalytic converter from below the body floor to the exhaust manifold which is near the engine, whereby the catalyst can be quickly warmed up after starting the engine. Due to such a location, however, the catalytic converter may be often exposed to high temperature of no less than 900° C. (or sometimes even higher than 1,000° C. Thus, the catalytic converter needs to provide a high catalytic activity even at such a high temperature. Further, the catalytic converter is also required to provide a high catalytic activity at relatively low temperature before the engine is sufficiently warmed up upon start thereof.

Japanese Patent Publication 5-47263 (which is the granted version of JP-A-63-156545) discloses a catalytic converter for cleaning exhaust gas wherein fine particles of zirconia ($ZrO_2$) carrying a precious metal (e.g. Pt, Rh) are coated on a heat-resistant honeycomb support together with particles of heat-resistant organic oxide (e.g. alumina) and particles of an oxygen-storing oxide of a rare earth element. While this prior art catalytic converter aims to provide a high catalytic activity at a high temperature, it does not pay any attention to catalytic activity at relatively low temperature.

DISCLOSURE OF THE INVENTION

It is, therefore, an object of the present invention to provide a catalytic converter for cleaning exhaust gas which is capable of maintaining a high catalytic activity even at high temperature while also providing an effective catalytic activity at relatively low temperature of e.g. 200~400° C. before the engine is sufficiently warmed up.

Another object of the present invention is to provide a catalytic converter for cleaning exhaust gas which is capable of preventing or reducing catalytic poisoning.

According to one aspect of the present invention, a catalytic converter for cleaning exhaust gas comprises a heat-resistant support, and a catalytic coating formed on the heat-resistant support, wherein the catalytic coating comprises particles of a cerium complex oxide, Pd carried on the cerium complex oxide particles, particles of zirconium complex oxide, a combination of Pt and Rh coexistently carried on the zirconium complex oxide particles, and particles of a heat-resistant inorganic oxide.

As described above, since the catalytic coating contains palladium (Pd) which provides a good catalytic activity at relatively low temperature, the catalytic converter is capable of effectively cleaning exhaust gas, particularly by removal of hydrocarbons (HC), even before the engine is sufficiently warmed up. In this regard, Pd should be selectively carried on the cerium complex oxide particles because the oxygen-storing ability of the cerium complex oxide converts Pd to PdO which provides a higher catalytic activity than Pd. Further, the cerium complex oxide restrains grain growth of Pd which may lead to a surface area decrease (i.e., a decrease of the catalytic activity). Thus, the Pd-carrying cerium complex oxide particles raise the CO—$NO_x$ removal cross point where the CO removal ratio and the $NO_x$ removal ratio coincide.

On the other hand, Pt and Rh are added for primarily enhancing the catalytic activity at high temperature. These precious metals should be selectively and coexistently carried on the zirconium complex oxide particles for the following reason. If Pt alone is carried on the zirconium complex oxide particles, the particles of Pt exhibit a tendency to grow due to the mass transfer of Pt at high temperature. By contrast, if Rh coexists, it restrains the mass transfer of Pt to prevent grain growth (presumably due to the formation of a rhodium oxide layer on the Pt particles which restrains the mass transfer of Pt). Further, Pt may alloy with Pd at high temperature to result in loss or decrease of their respective catalytic activity, so that they should be supported separately.

The catalytic coating may be a single layer. In this case, the single layer of catalytic coating may further contain at least one sulfate which prevents Pd from being poisoned with hydrocarbons contained in the exhaust gas. Since Pd is liable to poisoning with hydrocarbons, the addition of the poisoning-preventive sulfate is advantageous in maintaining the catalytic activity of Pd for a long time. Further, since the sulfate is thermally stable in comparison with carbonates and acetates used as a poisoning-preventive agent, it will not decompose at high temperature of 1,000° C. to form a complex oxide with the other catalytic components, thereby preventing the catalytic converter from deteriorating in its catalytic performance.

Preferably, the sulfate may be selected from the group consisting of barium sulfate, calcium sulfate, strontium sulfate, cesium sulfate, potassium sulfate, magnesium sulfate, yttrium sulfate, and lanthanum sulfate. Of these candidates, barium sulfate thermally decomposes at a high temperature of about 1,200° C., so that it will not decomposes at a temperature of about 1,000° C. to which the catalytic converter may be subjected when mounted at the intake manifold close to the engine. Thus, the catalytic converter containing the sulfate provides an excellent catalytic ability for a long time even under severe operating conditions while effectively preventing Pd from being poisoned with hydrocarbons.

According to a preferred embodiment, the catalytic coating includes a first coating layer which is formed on the heat-resistant support and contains the Pd-carrying cerium complex oxide particles, and a second coating layer which is formed on the first coating layer and contains the Pt- and Rh-carrying zirconium complex oxide particles.

With the multi-layer structure of the catalytic coating described above, since the Pd-carrying cerium complex oxide particles are contained in the first or inner coating layer, Pd is located farther from the poisoning components (hydrocarbons) and is therefore less likely to be poisoned therewith. In this case, the first coating layer may additionally contain a poisoning-preventive sulfate or sulfates, as already described above. Further, the second coating layer may also contain particles of a cerium complex oxide supporting at least one of Pt and Rh in addition to the Pt- & Rh-supporting zirconium complex oxide particles.

Preferably, the cerium complex oxide may be a complex of cerium dioxide (ceria) and zirconium dioxide (zirconia), which complex may additionally contain a small amount of a rare earth element and/or an alkaline earth metal. Typically, the cerium complex oxide may be represented by the following formula,

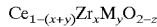

$$Ce_{1-(x+y)}Zr_xM_yO_{2-z}$$

where "M" represents at least one element selected from a group consisting of Y, La, Nd, Yb, Mg and Ca, "z" represents the degree of oxygen deficiency determined by the valence and content of the contained element M, $0.2 \leq x+y \leq 0.7$ (preferably $0.3 \leq x+y \leq 0.6$), $0.2 \leq x \leq 0.7$ (preferably $0.2 \leq x \leq 0.5$), and $0 \leq y \leq 0.2$ (preferably $0.03 \leq y \leq 0.12$). The zirconium element, which substitutes a part of the cerium element of the ceria crystal in solid solution, restrains grain growth of the ceria at high temperature, thereby providing an enhanced heat resistance. It should be understood that the content of Zr in the cerium complex oxide may include 1~3% of hafnium (Hf) which is inevitably contained in Zr ores.

The zirconium complex oxide for selectively carrying the combination of Pt and Rh may be obtained by substituting a part of Zr in zirconia with cerium. Further, the zirconium complex oxide may additionally contain a small amount of a rare earth element and/or an alkaline earth metal.

The heat-resistant inorganic oxide may be selected from a group consisting of alumina ($Al_2O_3$), silica ($SiO_2$), titania ($TiO_2$) and magnesia (MgO) all of which are commercially available. Particularly useful is activated alumina. Other examples of the heat-resistant inorganic oxide also include ceria ($CeO_2$), zirconia ($ZrO_2$), cerium complex oxide (other than that used for carrying Pd), and zirconium complex oxide (other than that used for carrying the combination of Pt and Rh).

The heat-resistant support, which may be made of cordierite, mullite, α-alumina or a metal (e.g. stainless steel), should preferably have a honeycomb structure. In producing the catalytic converter, the Pd-carrying particles of the cerium complex oxide, the Pt- & Rh-carrying particles of the zirconium complex oxide and the particles of the heat-resistant inorganic oxide may be coated together, by the known wash-coating method, over the honeycomb support.

The cerium complex oxide (and the zirconium complex oxide as well) used in the present invention may be prepared by using known techniques such as coprecipitation process or alkoxide process.

The coprecipitation process includes the steps of preparing a solution which contains respective salts of cerium, zirconium and optionally other rare earth element(s) and/or alkaline earth metal(s) in a predetermined stoichiometric ratio, then adding an aqueous alkaline solution or an organic acid to the salt solution for causing the respective salts to coprecipitate, and thereafter heat-treating the resulting coprecipitate for oxidization to provide a target cerium complex oxide.

Examples of salts of cerium and other rare earth elements (and/or alkaline) include sulfates, nitrates, hydrochlorides, phosphates, acetates and oxalates. Examples of zirconium salts include zirconium oxychloride, zirconium oxynitrate, zirconium oxysulfate and zirconium oxyacetate. Examples of aqueous alkaline solutions include an aqueous solution of sodium carbonate, aqueous ammonia, an aqueous solution of ammonium carbonate and an aqueous solution of sodium hydroxide. Examples of organic acids include oxalic acid and citric acid.

The heat treatment in the coprecipitation process includes a heat-drying step for drying the coprecipitate at about 50~200° C. for about 1~48 hours after filtration, and a baking step for baking the coprecipitate at about 350~1,000° C. (preferably about 400~800° C.) for about 1~12 hours. During the baking step, the baking conditions (the baking temperature and the baking period) should be selected depending on the composition of the cerium complex oxide so that at least part of the cerium complex oxide is in the form of solid solution.

The alkoxide process includes the steps of preparing an alkoxide mixture solution which contains cerium, zirconium and optionally other rare earth element(s) and/or alkaline earth metal(s) in a predetermined stoichiometric ratio, then adding a deionized water to the alkoxide mixture solution for causing zirconium, cerium and other rare earth element (and/or alkaline earth metal) to coprecipitate or hydrolyze, and thereafter heat-treating the resulting coprecipitate or hydrolysate to provide a target cerium complex oxide.

Examples of alkoxides usable for preparing the alkoxide mixture solution include respective methoxides, ethoxides, propoxides and butoxides of cerium, zirconium, and other rare earth element (and/or alkaline earth metal). Instead, ethylene oxide addition salts of each of these elements are also usable.

The heat treatment in the alkoxide process may be performed in the same way as that in the coprecipitation process.

Pd may be supported on the cerium complex oxide particles by using known techniques. For instance, a solution containing a salt (e.g. 1–20 wt %) of Pd is first prepared, the cerium complex oxide is then impregnated with the salt-containing solution, and thereafter the cerium complex oxide is heat-treated. Examples of salts usable for this purpose include nitrate, dinitro diammine nitrate, and chloride. The heat-treatment, which is performed after impregnation and filtration, may include drying the cerium complex oxide by heating at about 50~200° C. for about 1~48 hours and thereafter baking the complex oxide at about 350~1, 000° C. (preferably about 400~800° C.) for about 1~12 hours (preferably about 2~4 hours). Similarly, Pt and Rh may be supported on the zirconium complex oxide substantially in the same manner.

As previously described, the Pd-carrying particles of the cerium complex oxide, the Pt- & Rh-carrying particles of the zirconium complex oxide and the particles of the heat-resistant inorganic oxide may be coated on the heat-resistant honeycomb support by the known wash-coating method. For forming a mono-layer catalytic coating, specifically, the wash-coating process includes the steps of preparing an aqueous slurry which contains Pd-supporting cerium complex oxide, Pt- & Rh-supporting zirconium complex oxide and heat-resistant inorganic oxide (e.g. alumina), immersing the honeycomb support in the slurry, and baking the honeycomb support at a temperature of 600° C. for 3 hours for example. If a poisoning-preventive sulfate is to be contained in the catalytic coating, the sulfate needs only to be added to the slurry.

For forming a multi-layer catalytic coating, the wash-coating process includes the steps of preparing a first aqueous slurry which contains Pd-supporting cerium complex oxide and heat-resistant inorganic oxide (e.g. alumina), immersing the honeycomb support in the first slurry, baking the honeycomb support for forming a first coating layer, preparing a second aqueous slurry which contains Pt- & Rh-supporting zirconium complex oxide and heat-resistant inorganic oxide (e.g. alumina), immersing the first-coated honeycomb support in the second slurry, and baking the honeycomb support for forming a second coating layer over the first coating layer. If a poisoning-preventive sulfate is to be contained in the first coating layer, the sulfate needs only to be added to the first slurry.

According to a second aspect of the present invention, a catalytic converter for cleaning exhaust gas comprises a heat-resistant support, and a catalytic coating formed on the heat-resistant support, wherein the catalytic coating comprises Pd-carrying particles of a cerium complex oxide, particles of a heat-resistant inorganic oxide, and at least one sulfate which prevents Pd from being poisoned with hydrocarbons contained in the exhaust gas.

Other features and advantages of the present invention will be apparent from the following detailed description of the preferred embodiments given with reference to the accompanying drawings.

DETAILED DESCRIPTION OF THE PREFERRED EMBODIMENTS

Figure 1:
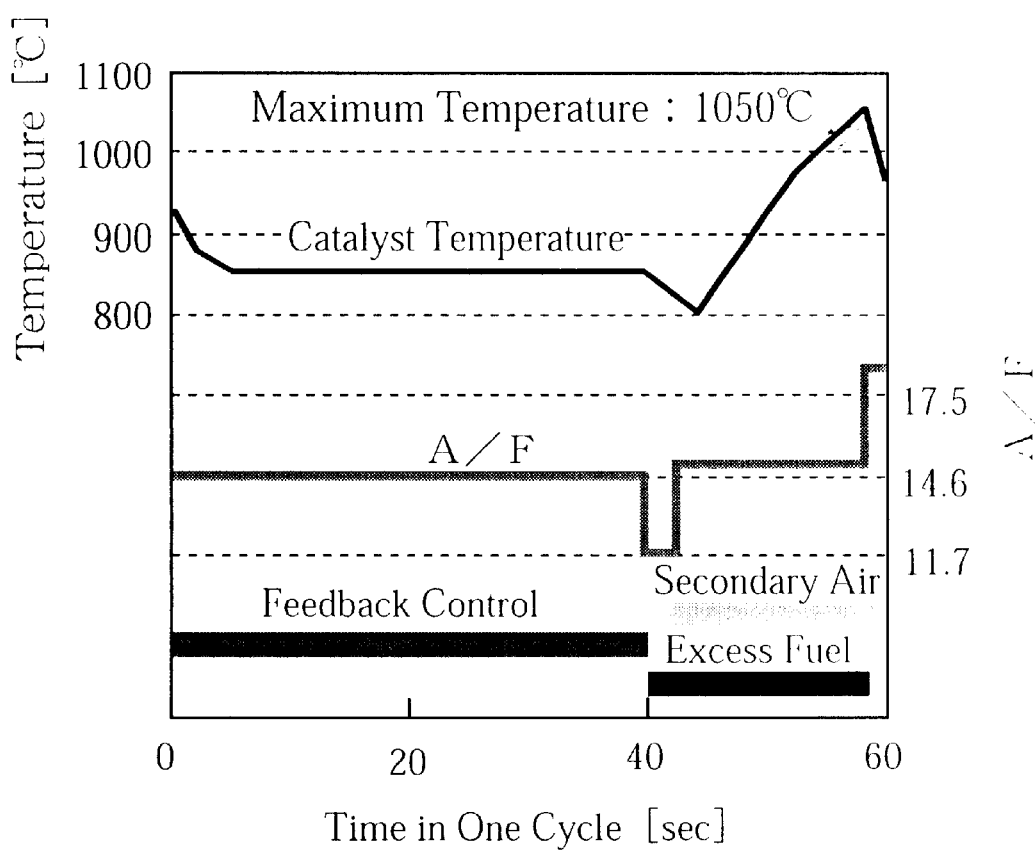
FIG. 1 is a graph showing a high-temperature aging cycle used for evaluating different catalytic converters in selected ones of embodiments of the present invention and in selected ones of comparative examples.

The preferred embodiments of the present invention will be described below together with comparative examples. However, it should be understood that the present invention is not limited to these embodiments. Further, it should be noted that the notation "Oxide" used below represents that the cerium or zirconium complex oxide contains a suitable proportion of oxygen which is unilaterally determined by the proportions of the other elements.

Embodiment 1

In this embodiment, a catalytic converter was made using a cerium complex oxide having the composition of $Ce_{0.6}Zr_{0.3}Y_{0.1}Oxide$ (hereafter abbreviated as "CZY"), and a zirconium complex oxide having the composition of $Zr_{0.80}Ce_{0.16}La_{0.02}Nd_{0.02}Oxide$ (hereafter abbreviated as "ZCLN") In Embodiment 1 and any subsequent embodiments, the specific process of preparing the complex oxides will not be described because the preparation process is already clear from the foregoing description given the specific composition.

(Preparation of Pd-Supporting CZY)

Powder of CZY was impregnated with an aqueous solution of palladium nitrate (Pd content: 1.8 wt % relative to the weight of CZY). The thus impregnated CZY powder was first dried and then baked at 600° C. for 3 hours. As a result, the CZY power was made to support or carry Pd.

(Preparation of Pt- & Rh-Supporting ZCLN)

Powder of ZCLN was impregnated with an aqueous solution of dinitro diammineplatinum nitrate (Pt content: 2.0 wt % relative to the weight of ZCLN) and an aqueous solution of rhodium nitrate (Rh content: 1.4 wt % relative to the weight of ZCLN). The thus impregnated ZCLN powder was first dried and then baked at 600° C. for 3 hours. As a result, the ZCLN powder was made to support or carry both of Pt and Rh.

(Fabrication of Catalytic Converter)

Then, the Pd-supporting CZY powder and the Pt- & Rh-supporting ZCLN powder were mixed with activated alumina powder and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 600° C. for 3 hours. The target catalytic converter was thus obtained.

The thus obtained mono-layer catalytic coating of the catalytic converter contained, per dm$^3$ (apparent volume) of the honeycomb support, 85 g of CZY, 50 g of ZCLN, 120 g of alumina, 1.5 g of Pd (as supported selectively on CZY), 1.0 g of Pt (as supported selectively on ZCLN), and 0.7 g of Rh (as supported selectively on ZCLN).

Embodiment 2

In this embodiment, a catalytic converter was made using Pd-supporting CZY and Pt- & Rh-supporting ZCLN, similarly to Embodiment 1.

(Preparation of Pd-Supporting CZY)

Powder of CZY was impregnated with an aqueous solution of palladium nitrate (Pd content: 1.8 wt % relative to the weight of CZY). The thus impregnated CZY powder was first dried and then baked at 600° C. for 3 hours. As a result, the CZY power was made to support or carry Pd.

(Preparation of Pt- & Rh-Supporting ZCLN)

Powder of ZCLN was impregnated with an aqueous solution of dinitro diammineplatinum nitrate (Pt content: 2.0 wt % relative to the weight of ZCLN) and an aqueous solution of rhodium nitrate (Rh content: 1.4 wt % relative to the weight of ZCLN). The thus impregnated ZCLN powder was first dried and then baked at 600° C. for 3 hours. As a result, the ZCLN powder was made to support or carry both of Pt and Rh.

(Fabrication of Catalytic Converter)

Then, the Pd-supporting CZY powder and the Pt- & Rh-supporting ZCLN powder were mixed with activated alumina powder, barium sulfate and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 600° C. for 3 hours. The target catalytic converter was thus obtained.

The thus prepared mono-layer catalytic coating of the catalytic converter contained, per dm$^3$ (apparent volume) of the honeycomb support, 85 g of CZY, 50 g of ZCLN, 120 g of alumina, 1.5 g of Pd (as supported selectively on CZY), 1.0 g of Pt (as supported selectively on ZCLN), 0.7 g of Rh (as supported selectively on ZCLN), and 0.1 mol of barium sulfate.

Embodiment 3

In this embodiment, a catalytic converter having a multi-layer catalytic coating was made using Pd-supporting CZY and Pt- & Rh-supporting ZCLN.

(Preparation of Pd-Supporting CZY)

Powder of CZY was impregnated with an aqueous solution of palladium nitrate (Pd content: 1.8 wt % relative to the weight of CZY). The thus impregnated CZY powder was first dried and then baked at 600° C. for 3 hours. As a result, the CZY power was made to support or carry Pd.

(Preparation of Pt- & Rh-Supporting ZCLN)

Powder of ZCLN was impregnated with an aqueous solution of dinitro diammineplatinum nitrate (Pt content: 2.0 wt % relative to the weight of ZCLN) and an aqueous solution of rhodium nitrate (Rh content: 1.4 wt % relative to the weight of ZCLN). The thus impregnated ZCLN powder was first dried and then baked at 600° C. for 3 hours. As a result, the ZCLN powder was made to support or carry both of Pt and Rh.

(Fabrication of Catalytic Converter)

The Pd-supporting CZY powder was mixed with activated alumina powder and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting ZCLN powder was mixed with activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target catalytic converter was thus obtained.

The first coating layer of the catalytic converter thus prepared in Embodiment 3 contained, per dm$^3$ (apparent volume) of the honeycomb support, 85 g of CZY, 55 g of alumina, and 1.5 g of Pd (as supported selectively on CZY).

On the other hand, the second coating layer contained, per dm$^3$ (apparent volume) of the honeycomb support, 50 g of ZCLN, 65 g of alumina, 1.0 g of Pt (as supported selectively on ZCLN), and 0.7 g of Rh (as supported selectively on ZCLN).

Embodiment 4

In this embodiment, a catalytic converter having a multi-layer catalytic coating was made using Pd-supporting CZY and Pt- & Rh-supporting ZCLN.

(Preparation of Pd-Supporting CZY)

Powder of CZY was impregnated with an aqueous solution of palladium nitrate (Pd content: 1.8 wt % relative to the weight of CZY). The thus impregnated CZY powder was first dried and then baked at 600° C. for 3 hours. As a result, the CZY power was made to support or carry Pd.

(Preparation of Pt- & Rh-Supporting ZCLN)

Powder of ZCLN was impregnated with an aqueous solution of dinitro diammineplatinum nitrate (Pt content: 2.0 wt % relative to the weight of ZCLN) and an aqueous solution of rhodium nitrate (Rh content: 1.4 wt % relative to the weight of ZCLN). The thus impregnated ZCLN powder was first dried and then baked at 600° C. for 3 hours. As a result, the ZCLN powder was made to support or carry both of Pt and Rh.

(Fabrication of Catalytic Converter)

The Pd-supporting CZY powder was mixed with activated alumina powder, barium sulfate and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting ZCLN powder was mixed with activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target catalytic converter was thus obtained.

The first coating layer of the catalytic converter thus prepared in Embodiment 4 contained, per dm$^3$ (apparent volume) of the honeycomb support, 85 g of CZY, 55 g of alumina, 1.5 g of Pd (as supported selectively on CZY), and 0.1 mol of barium sulfate.

On the other hand, the second coating layer contained, per dm$^3$ (apparent volume) of the honeycomb support, 50 g of ZCLN, 65 g of alumina, 1.0 g of Pt (as supported selectively on ZCLN), and 0.7 g of Rh (as supported selectively on ZCLN).

Embodiment 5

In this embodiment, a catalytic converter having a multi-layer catalytic coating was made using Pd-supporting CZY, Pt- & Rh-supporting ZCLN, and Pt- & Rh-supporting CZY.

(Preparation of Pd-Supporting CZY)

Powder of CZY was impregnated with an aqueous solution of palladium nitrate (Pd content: 4.3 wt % relative to the weight of CZY). The thus impregnated CZY powder was first dried and then baked at 600° C. for 3 hours. As a result, the CZY power was made to support or carry Pd.

(Preparation of Pt- & Rh-Supporting ZCLN)

Powder of ZCLN was impregnated with an aqueous solution of dinitro diammineplatinum nitrate (Pt content: 1.6 wt % relative to the weight of ZCLN) and an aqueous solution of rhodium nitrate (Rh content: 1.2 wt % relative to the weight of ZCLN). The thus impregnated ZCLN powder was first dried and then baked at 600° C. for 3 hours. As a result, the ZCLN powder was made to support or carry both of Pt and Rh.

(Preparation of Pt- & Rh-Supporting CZY)

Powder of CZY was impregnated with an aqueous solution of dinitro diammineplatinum nitrate (Pt content: 0.4 wt % relative to the weight of CZY) and an aqueous solution of rhodium nitrate (Rh content: 0.2 wt % relative to the weight of CZY). The thus impregnated CZY powder was first dried and then baked at 600° C. for 3 hours. As a result, the CZY powder was made to support or carry both of Pt and Rh.

(Fabrication of Catalytic Converter)

The Pd-supporting CZY powder was mixed with activated alumina powder, barium sulfate and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting ZCLN powder and the Pt- & Rh-supporting CZY powder were mixed with activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target catalytic converter was thus obtained.

The first coating layer of the catalytic converter thus prepared in Embodiment 5 contained, per $dm^3$ (apparent volume) of the honeycomb support, 35 g of CZY, 55 g of alumina, 1.5 g of Pd (as supported selectively on CZY), and 0.1 mol of barium sulfate.

On the other hand, the second coating layer contained, per $dm^3$ (apparent volume) of the honeycomb support, 50 g of ZCLN, 50 g of CZY, 65 g of alumina, 1.0 g of Pt (as supported separately on ZCLN and CZY), and 0.7 g of Rh (as supported separately on ZCLN and CZY).

Embodiment 6

In this embodiment, a catalytic converter having a multi-layer catalytic coating was made using Pd-supporting CZY, Pt- & Rh-supporting ZCLN, and Pt-supporting CZY.

(Preparation of Pd-Supporting CZY)

Powder of CZY was impregnated with an aqueous solution of palladium nitrate (Pd content: 4.3 wt % relative to the weight of CZY). The thus impregnated CZY powder was first dried and then baked at 600° C. for 3 hours. As a result, the CZY power was made to support or carry Pd.

(Preparation of Pt- & Rh-Supporting ZCLN)

Powder of ZCLN was impregnated with an aqueous solution of dinitro diammineplatinum nitrate (Pt content: 1.4 wt % relative to the weight of ZCLN) and an aqueous solution of rhodium nitrate (Rh content: 1.4 wt % relative to the weight of ZCLN). The thus impregnated ZCLN powder was first dried and then baked at 600° C. for 3 hours. As a result, the ZCLN powder was made to support or carry both of Pt and Rh.

(Preparation of Pt-Supporting CZY)

Powder of CZY was impregnated with an aqueous solution of dinitro diammineplatinum nitrate (Pt content: 0.6 wt % relative to the weight of CZY). The thus impregnated CZY powder was first dried and then baked at 600° C. for 3 hours. As a result, the CZY powder was made to support or carry Pt.

(Fabrication of Catalytic Converter)

The Pd-supporting CZY powder was mixed with activated alumina powder, barium sulfate and alumina sol in a ball mill and wet-crushed to provide a mixture slurry. The mixture slurry was then coated on a monolithic cordierite honeycomb support which had 400 cells/$in^2$ (62 cells/$cm^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting ZCLN powder and the Pt-supporting CZY powder were mixed with activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target catalytic converter was thus obtained.

The first coating layer of the catalytic converter thus prepared in Embodiment 6 contained, per $dm^3$ (apparent volume) of the honeycomb support, 35 g of CZY, 55 g of alumina, 1.5 g of Pd (as supported selectively on CZY), and 0.1 mol of barium sulfate.

On the other hand, the second coating layer contained, per $dm^3$ (apparent volume) of the honeycomb support, 50 g of ZCLN, 50 g of CZY, 65 g of alumina, 1.0 g of Pt (as supported separately on ZCLN and CZY), and 0.7 g of Rh (as supported selectively on ZCLN).

Embodiment 7

In this embodiment, a catalytic converter having a multi-layer catalytic coating was made using Pd-supporting CZY, Pt- & Rh-supporting ZCLN, and CZY (supporting no precious metal).

(Preparation of Pd-Supporting CZY)

Powder of CZY was impregnated with an aqueous solution of palladium nitrate (Pd content: 4.3 wt % relative to the weight of CZY). The thus impregnated CZY powder was first dried and then baked at 600° C. for 3 hours. As a result, the CZY power was made to support or carry Pd.

(Preparation of Pt- & Rh-Supporting ZCLN)

Powder of ZCLN was impregnated with an aqueous solution of dinitro diammineplatinum nitrate (Pt content: 2.0 wt % relative to the weight of ZCLN) and an aqueous solution of rhodium nitrate (Rh content: 1.4 wt % relative to the weight of ZCLN). The thus impregnated ZCLN powder was first dried and then baked at 600° C. for 3 hours. As a result, the ZCLN powder was made to support or carry both of Pt and Rh.

(Fabrication of Catalytic Converter)

The Pd-supporting CZY powder was mixed with activated alumina powder, barium sulfate and alumina sol in a ball mill and wet-crushed to provide a mixture slurry. The mixture slurry was then coated on a monolithic cordierite honeycomb support which had 400 cells/$in^2$ (62 cells/$cm^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting ZCLN powder was mixed with CZY powder (not supporting any precious metal), activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target catalytic converter was thus obtained.

The first coating layer of the catalytic converter thus prepared in Embodiment 7 contained, per $dm^3$ (apparent volume) of the honeycomb support, 35 g of CZY, 55 g of alumina, 1.5 g of Pd (as supported selectively on CZY), and 0.1 mol of barium sulfate.

On the other hand, the second coating layer contained, per $dm^3$ (apparent volume) of the honeycomb support, 50 g of ZCLN, 50 g of CZY, 65 g of alumina, 1.0 g of Pt (as supported selectively on ZCLN), and 0.7 g of Rh (as supported selectively on ZCLN).

Embodiment 8

In this embodiment, a catalytic converter having a multi-layer catalytic coating was made using Pd-supporting CZY, Pt- & Rh-supporting zirconium complex oxide having the composition of $Zr_{0.7}Ce_{0.2}La_{0.1}$Oxide (hereafter abbreviated as "ZCL"), and CZY (supporting no precious metal).

(Preparation of Pd-Supporting CZY)

Powder of CZY was impregnated with an aqueous solution of palladium nitrate (Pd content: 4.3 wt % relative to the weight of CZY). The thus impregnated CZY powder was first dried and then baked at 600° C. for 3 hours. As a result, the CZY power was made to support or carry Pd.

(Preparation of Pt- & Rh-Supporting ZCL)

Powder of ZCL was impregnated with an aqueous solution of dinitro diammineplatinum nitrate (Pt content: 2.0 wt % relative to the weight of ZCL) and an aqueous solution of rhodium nitrate (Rh content: 1.4 wt % relative to the weight of ZCL). The thus impregnated ZCL powder was first dried and then baked at 600° C. for 3 hours. As a result, the ZCL powder was made to support or carry both of Pt and Rh.

(Fabrication of Catalytic Converter)

The Pd-supporting CZY powder was mixed with activated alumina powder, barium sulfate and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting ZCL powder was mixed with CZY powder (not supporting any precious metal), activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target catalytic converter was thus obtained.

The first coating layer of the catalytic converter thus prepared in Embodiment 8 contained, per dm$^3$ (apparent volume) of the honeycomb support, 35 g of CZY, 55 g of alumina, 1.5 g of Pd (as supported selectively on CZY), and 0.1 mol of barium sulfate.

On the other hand, the second coating layer contained, per dm$^3$ (apparent volume) of the honeycomb support, 50 g of ZCL, 50 g of CZY, 65 g of alumina, 1.0 g of Pt (as supported selectively on ZCL), and 0.7 g of Rh (as supported selectively on ZCL).

Embodiment 9

In this embodiment, a catalytic converter having a multi-layer catalytic coating was made using Pd-supporting CZY, Pt- & Rh-supporting zirconium complex oxide having the composition of $Zr_{0.9}Ce_{0.1}O_2$ (hereafter abbreviated as "ZC"), and CZY (supporting no precious metal).

(Preparation of Pd-Supporting CZY)

Powder of CZY was impregnated with an aqueous solution of palladium nitrate (Pd content: 4.3 wt % relative to the weight of CZY). The thus impregnated CZY powder was first dried and then baked at 600° C. for 3 hours. As a result, the CZY power was made to support or carry Pd.

(Preparation of Pt- & Rh-Supporting ZC)

Powder of ZC was impregnated with an aqueous solution of dinitro diammineplatinum nitrate (Pt content: 2.0 wt % relative to the weight of ZC) and an aqueous solution of rhodium nitrate (Rh content: 1.4 wt % relative to the weight of ZC). The thus impregnated ZC powder was first dried and then baked at 600° C. for 3 hours. As a result, the ZC powder was made to support or carry both of Pt and Rh.

(Fabrication of Catalytic Converter)

The Pd-supporting CZY powder was mixed with activated alumina powder, barium sulfate and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting ZC powder was mixed with CZY powder (not supporting any precious metal), activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target catalytic converter was thus obtained.

The first coating layer of the catalytic converter thus prepared in Embodiment 9 contained, per dm$^3$ (apparent volume) of the honeycomb support, 35 g of CZY, 55 g of alumina, 1.5 g of Pd (as supported selectively on CZY), and 0.1 mol of barium sulfate.

On the other hand, the second coating layer contained, per dm$^3$ (apparent volume) of the honeycomb support, 50 g of ZC, 50 g of CZY, 65 g of alumina, 1.0 g of Pt (as supported selectively on ZC), and 0.7 g of Rh (as supported selectively on ZC).

Embodiment 10

In this embodiment, a catalytic converter having a multi-layer catalytic coating was made using Pd-supporting cerium complex oxide having the composition of $Ce_{0.3}Zr_{0.5}Y_{0.2}Oxide$ (hereafter abbreviated as "CZY2"), Pt- & Rh-supporting ZCLN, and CZY2 (supporting no precious metal).

(Preparation of Pd-Supporting CZY2)

Powder of CZY2 was impregnated with an aqueous solution of palladium nitrate (Pd content: 4.3 wt % relative to the weight of CZY2). The thus impregnated CZY2 powder was first dried and then baked at 600° C. for 3 hours. As a result, the CZY2 power was made to support or carry Pd.

(Preparation of Pt- & Rh-Supporting ZCLN)

Powder of ZCLN was impregnated with an aqueous solution of dinitro diammineplatinum nitrate (Pt content: 2.0 wt % relative to the weight of ZCLN) and an aqueous solution of rhodium nitrate (Rh content: 1.4 wt % relative to the weight of ZCLN). The thus impregnated ZCLN powder was first dried and then baked at 600° C. for 3 hours. As a result, the ZCLN powder was made to support or carry both of Pt and Rh.

(Fabrication of Catalytic Converter)

The Pd-supporting CZY2 powder was mixed with activated alumina powder, barium sulfate and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting ZCLN powder was mixed with CZY2 powder (not supporting any precious metal), activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target catalytic converter was thus obtained.

The first coating layer of the catalytic converter thus prepared in Embodiment 10 contained, per dm$^3$ (apparent volume) of the honeycomb support, 35 g of CZY2, 55 g of alumina, 1.5 g of Pd (as supported selectively on CZY2), and 0.1 mol of barium sulfate.

On the other hand, the second coating layer contained, per dm$^3$ (apparent volume) of the honeycomb support, 50 g of ZCLN, 50 g of CZY2, 65 g of alumina, 1.0 g of Pt (as supported selectively on ZCLN), and 0.7 g of Rh (as supported selectively on ZCLN).

Embodiment 11

In this embodiment, a catalytic converter having a multi-layer catalytic coating was made using Pd-supporting cerium complex oxide having the composition of $Ce_{0.8}Zr_{0.2}O_2$ (hereafter abbreviated as "CZ"), Pt- & Rh-supporting ZCLN, and CZ (supporting no precious metal).

(Preparation of Pd-Supporting CZ)

Powder of CZ was impregnated with an aqueous solution of palladium nitrate (Pd content: 4.3 wt % relative to the weight of CZ). The thus impregnated CZ powder was first dried and then baked at 600° C. for 3 hours. As a result, the CZ power was made to support or carry Pd.

(Preparation of Pt- & Rh-Supporting ZCLN)

Powder of ZCLN was impregnated with an aqueous solution of dinitro diammineplatinum nitrate (Pt content: 2.0 wt % relative to the weight of ZCLN) and an aqueous solution of rhodium nitrate (Rh content: 1.4 wt % relative to the weight of ZCLN). The thus impregnated ZCLN powder was first dried and then baked at 600° C. for 3 hours. As a result, the ZCLN powder was made to support or carry both of Pt and Rh.

(Fabrication of Catalytic Converter)

The Pd-supporting CZ powder was mixed with activated alumina powder, barium sulfate and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting ZCLN powder was mixed with CZ powder (not supporting any precious metal), activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target catalytic converter was thus obtained.

The first coating layer of the catalytic converter thus prepared in Embodiment 11 contained, per dm$^3$ (apparent volume) of the honeycomb support, 35 g of CZ, 55 g of alumina, 1.5 g of Pd (as supported selectively on CZ), and 0.1 mol of barium sulfate.

On the other hand, the second coating layer contained, per dm$^3$ (apparent volume) of the honeycomb support, 50 g of ZCLN, 50 g of CZ, 65 g of alumina, 1.0 g of Pt (as supported selectively on ZCLN), and 0.7 g of Rh (as supported selectively on ZCLN).

Comparative Example 1

For comparison, a catalytic converter having a mono-layer catalytic coating was made using CZY and ZCLN.

Specifically, powder of CZY and powder of ZCLN were mixed with activated alumina powder and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 600° C. for 3 hours. Then, the coated honeycomb support was successively impregnated with an aqueous solution of palladium nitrate, an aqueous solution of dinitro diammineplatinum nitrate, and an aqueous solution of rhodium nitrate. Finally, the thus impregnated honeycomb support was dried and then baked at 600° C. for 3 hours. The target comparative catalytic converter was thus obtained.

The catalytic converter thus prepared in Comparative Example 1 contained, per dm$^3$ (apparent volume) of the honeycomb support, 85 g of CZY, 50 g of ZCLN, 120 g of alumina, 1.5 g of Pd (as supported over the surface of the catalytic coating), 1.0 g of Pt (as supported over the surface of the catalytic coating), and 0.7 g of Rh (as supported over the surface of the catalytic coating).

Comparative Example 2

In Comparative Example 2, a catalytic converter having a mono-layer catalytic coating was made using CZY and ZCLN.

Specifically, powder of CZY and powder of ZCLN were mixed with activated alumina powder and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 600° C. for 3 hours. Then, the coated honeycomb support was successively impregnated with an aqueous solution of palladium nitrate, an aqueous solution of dinitro diammineplatinum nitrate, an aqueous solution of rhodium nitrate, and a solution of barium acetate. Finally, the thus impregnated honeycomb support was dried and then baked at 600° C. for 3 hours. The target comparative catalytic converter was thus obtained.

The catalytic converter thus prepared in Comparative Example 2 contained, per dm$^3$ (apparent volume) of the honeycomb support, 85 g of CZY, 50 g of ZCLN, 120 g of alumina, 1.5 g of Pd (as supported over the surface of the catalytic coating), 1.0 g of Pt (as supported over the surface of the catalytic coating), 0.7 g of Rh (as supported over the surface of the catalytic coating), and 0.1 mol of barium acetate.

Comparative Example 3

In Comparative Example 3, a catalytic converter having a multi-layer catalytic coating was made using Pd-supporting alumina and Rh-supporting alumina.

(Preparation of Pd-Supporting alumina)

Powder of activated alumina was impregnated with an aqueous solution of palladium nitrate (Pd content: 4.3 wt % relative to the weight of alumina). The thus impregnated alumina powder was first dried and then baked at 600° C. for 3 hours. As a result, the alumina power was made to support or carry Pd.

(Preparation of Rh-Supporting alumina)

Powder of alumina was impregnated with an aqueous solution of rhodium nitrate (Rh content: 3.5 wt % relative to the weight of alumina). The thus impregnated alumina powder was first dried and then baked at 600° C. for 3 hours. As a result, the alumina powder was made to support or carry Rh.

(Fabrication of Catalytic Converter)

The Pd-supporting alumina powder was mixed with powder of ceria ($CeO_2$) in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Rh-supporting alumina powder was mixed with powder of zirconium complex oxide having the composition of $Zr_{0.8}Ce_{0.1}Nd_{0.1}Oxide$ (hereafter abbreviated as "ZCN"), activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target comparative catalytic converter was thus obtained.

The first coating layer of the catalytic converter thus prepared in Comparative Example 3 contained, per dm$^3$ (apparent volume) of the honeycomb support, 60 g of alumina, 60 g of ceria, and 2.5 g of Pd (as supported selectively on alumina).

On the other hand, the second coating layer contained, per $dm^3$ (apparent volume) of the honeycomb support, 40 g of alumina, 20 g of ZCN, and 0.7 g of Rh (as supported selectively on 20 g of alumina).

Comparative Example 4

In Comparative Example 4, a catalytic converter having a multi-layer catalytic coating was made using Pt- & Pd-supporting alumina and Rh-supporting alumina.

(Preparation of Pt- & Pd-Supporting alumina)

Powder of activated alumina was impregnated with an aqueous solution of dinitro diammineplatinum nitrate (Pt content: 1.8 wt % relative to the weight of alumina) and an aqueous solution of palladium nitrate (Pd content: 2.7 wt % relative to the weight of alumina). The thus impregnated alumina powder was first dried and then baked at 600° C. for 3 hours. As a result, the alumina power was made to support both of Pt and Pd.

(Preparation of Rh-Supporting alumina)

Powder of alumina was impregnated with an aqueous solution of rhodium nitrate (Rh content: 1.1 wt % relative to the weight of alumina). The thus impregnated alumina powder was first dried and then baked at 600° C. for 3 hours. As a result, the alumina powder was made to support Rh.

(Fabrication of Catalytic Converter)

The Pd-supporting alumina powder was mixed with powder of CZY in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Rh-supporting alumina powder was mixed with powder of CZLN in a ball mill and wet-crushed to provide a mixture slurry. The mixture slurry was coated on the first catalytic coating layer, then dried and finally baked at 600° C. for 3 hours, thereby providing a second catalytic coating layer. The target comparative catalytic converter was thus obtained.

The first coating layer of the catalytic converter thus prepared in Comparative Example 4 contained, per dm$^3$ (apparent volume) of the honeycomb support, 55 g of alumina, 85 g of CZY, 1.0 g of Pt (as supported selectively on alumina), and 1.5 g of Pd (as supported selectively on alumina).

On the other hand, the second coating layer contained, per dm$^3$ (apparent volume) of the honeycomb support, 65 g of alumina, 50 g of ZCLN, and 0.7 g of Rh (as supported selectively on alumina).

Comparative Example 5

In Comparative Example 5, a catalytic converter having a multi-layer catalytic coating was made using Pd- & Rh-supporting CZY and Pt-supporting ZCLN.

(Preparation of Pd- & Rh-Supporting CZY)

Powder of CZY was impregnated with an aqueous solution of palladium nitrate (Pd content: 4.3 wt % relative to the weight of CZY) and an aqueous solution of rhodium nitrate (Rh content: 2.0 wt % relative to the weight of CZY). The thus impregnated CZ powder was first dried and then baked at 600° C. for 3 hours. As a result, the CZY power was made to support both of Pd and Rh.

(Preparation of Pt-Supporting ZCLN)

Powder of ZCLN was impregnated with an aqueous solution of dinitro diammineplatinum nitrate (Pt content: 2.0 wt % relative to the weight of ZCLN). The thus impregnated ZCLN powder was first dried and then baked at 600° C. for 3 hours. As a result, the ZCLN powder was made to support Pt.

(Fabrication of Catalytic Converter)

The Pd- & Rh-supporting CZY powder was mixed with activated alumina powder, barium sulfate and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Pt-supporting ZCLN powder was mixed with activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target comparative catalytic converter was thus obtained.

The first coating layer of the catalytic converter thus prepared in Comparative Example 5 contained, per dm$^3$ (apparent volume) of the honeycomb support, 35 g of CZY, 55 g of alumina, 1.5 g of Pd (as supported selectively on CZY), 0.7 g of Rh (as supported selectively on CZY), and 0.1 mol of barium sulfate.

On the other hand, the second coating layer contained, per dm$^3$ (apparent volume) of the honeycomb support, 50 g of ZCLN, 50 g of CZ, 65 g of alumina, and 1.0 g of Pt (as supported selectively on ZCLN).

Comparative Example 6

In Comparative Example 6, a catalytic converter having a multi-layer catalytic coating was made using Pd-supporting ceria and Pt- & Rh-supporting zirconia ($ZrO_2$).

(Preparation of Pd-Supporting Ceria)

Powder of ceria was impregnated with an aqueous solution of palladium nitrate (Pd content: 4.3 wt % relative to the weight of ceria). The thus impregnated ceria powder was first dried and then baked at 600° C. for 3 hours. As a result, the ceria power was made to support Pd.

(Preparation of Pt-Supporting Zirconia)

Powder of zirconia was impregnated with an aqueous solution of dinitro diammineplatinum nitrate (Pt content: 2.0 wt % relative to the weight of zirconia) and an aqueous solution of rhodium nitrate (Rh content: 1.4 wt % relative to the weight of zirconia). The thus impregnated zirconia powder was first dried and then baked at 600° C. for 3 hours. As a result, the zirconia powder was made to support both of Pt and Rh.

(Fabrication of Catalytic Converter)

The Pd-supporting ceria powder was mixed with activated alumina powder, barium sulfate and alumina sol in a ball mill and wet-crushed to provide a mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried and then baked at 300° C. for 3 hours, thereby providing a first catalytic coating layer.

Then, the Pt- & Rh-supporting zirconia powder was mixed with ceria powder, activated alumina powder and alumina sol in a ball mill and wet-crushed to provide a mixture slurry. The mixture slurry was coated on the first catalytic coating layer, then dried and finally baked at 600° C. for 3 hours, thereby providing a second catalytic coating layer. The target comparative catalytic converter was thus obtained.

The first coating layer of the catalytic converter thus prepared in Comparative Example 6 contained, per dm$^3$ (apparent volume) of the honeycomb support, 35 g of ceria, 55 g of alumina, 1.5 g of Pd (as supported selectively on ceria), and 0.1 mol of barium sulfate.

On the other hand, the second coating layer contained, per dm$^3$ (apparent volume) of the honeycomb support, 50 g of zirconia, 50 g of ceria, 65 g of alumina, 1.0 g of Pt (as supported selectively on zirconia)and 0.7 g of Rh (as supported selectively on zirconia).

Performance Evaluation of Catalytic Converters

The respective catalytic converters fabricated according to Embodiments 1~9 and Comparative Examples 1~4 were tested for their performance in cleaning exhaust gas after aging according to either one of two different modes to be described below.

(1050A1 Aging)

The 1050A1 aging mode was applied to the respective catalytic converters fabricated according to Embodiments 12 and Comparative Examples 12.

According to the 1050A1 aging mode, each of the catalytic converters was mounted on one bank (4 cylinders) of a 4-liter V8-engine which was actually installed on a car, and the engine exhaust gas was introduced into the converter. Specifically, the cycle illustrated in FIG. 1 and continuing for 60 seconds was repeated 3,000 times for a total period of 50 hours.

As shown in FIG. 1, the cycle included a stoichiometric running period (0~40 sec.) wherein the engine is set to run with the feed of stoichiometric air-fuel mixture (A/F=14.6) under feedback control so that the inside temperature of the converter was held at about 850° C. The stoichiometric running period was followed by a fuel-rich period (40~44 sec.) wherein the engine was set to run with the feed of excessive fuel (A/F=11.7) under interruption of the feedback control. The fuel-rich period was then followed by a temperature-rise period (44~56 sec.) wherein the engine continued to run with the feed of excessive fuel under continued interruption of the feedback control but wherein secondary air is introduced from outside the engine into the catalytic converter for reacting the excess fuel with the secondary air within the converter, thereby causing the temperature to rise to a maximum of 1,050° C. The air-fuel mixture supplied to the combination of the engine and the catalytic converter in this temperature-rise period was slightly fuel-lean (A/F=14.8). The temperature-rise period is followed by a lean-running period (56~60 sec.) wherein the feedback control resumes with respect to the engine with the converter held in the fuel-lean state (A/F=18.0) under continued supply of the secondary air.

It should be mentioned here that the temperature within the catalytic converter was detected by a thermocouple inserted in the honeycomb support.

(1100A1 Aging)

The 1100A1 aging mode was applied to the respective catalytic converters fabricated according to Embodiments 3~11 and Comparative Examples 3~6.

According to the 1100A1 aging mode, each of the catalytic converters was mounted on one bank (4 cylinders) of a 4-liter V8-engine which was actually installed on a car, and the engine exhaust gas was introduced into the converter. Specifically, the cycle illustrated in FIG. 2 and continuing for 60 seconds was repeated 3,000 times for a total period of 50 hours.

Figure 2:
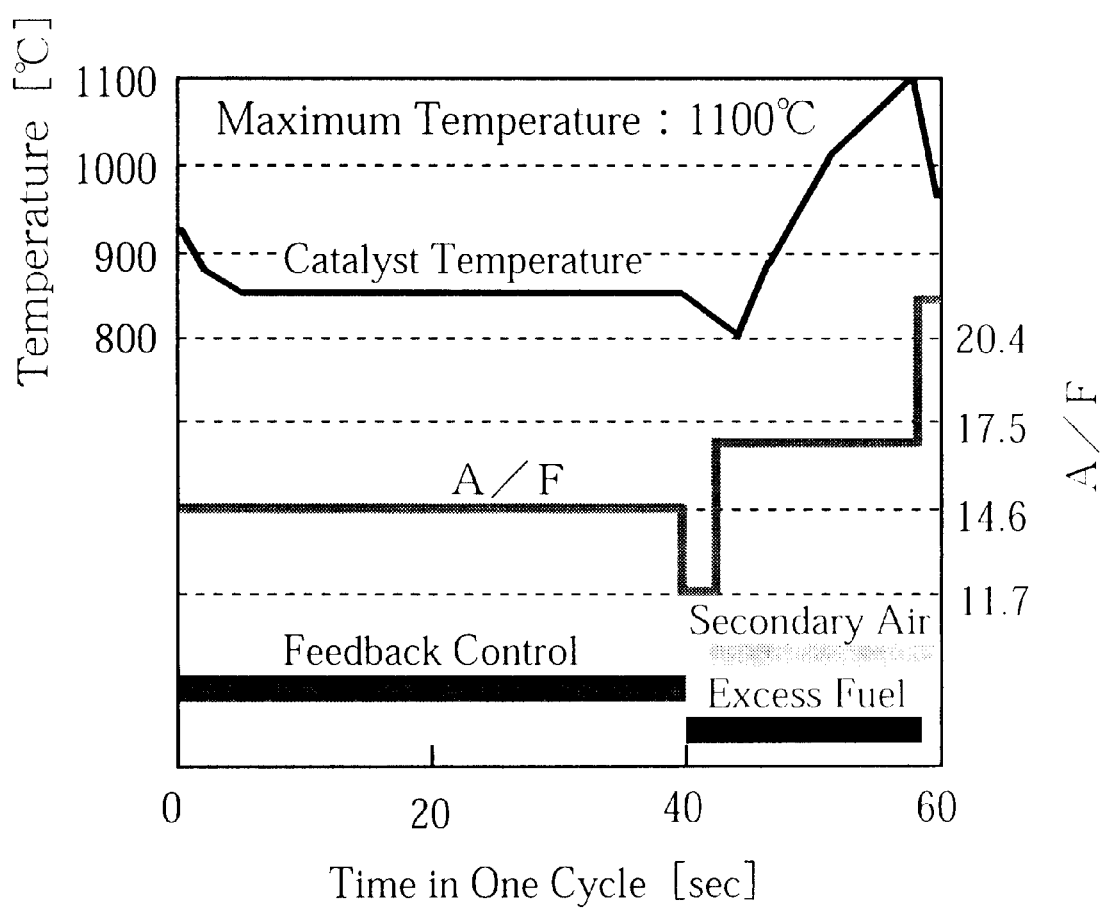
FIG. 2 is a graph showing another high-temperature aging cycle used for evaluating different catalytic converters in the other ones of embodiments of the present invention and in the other ones of comparative examples.

As shown in FIG. 2, the cycle included a stoichiometric running period (0~40 sec.) wherein the engine is set to run with the feed of stoichiometric air-fuel mixture (A/F=14.6) under feedback control so that the inside temperature of the converter was held at about 850° C. The stoichiometric running period was followed by a fuel-rich period (40~44 sec.) wherein the engine was set to run with the feed of excessive fuel (A/F=11.7) under interruption of the feedback control. The fuel-rich period was then followed by a temperature-rise period (44~56 sec.) wherein the engine continued to run with the feed of excessive fuel under continued interruption of the feedback control but wherein secondary air is introduced from outside the engine into the catalytic converter for reacting the excess fuel with the secondary air within the converter, thereby causing the temperature to rise to a maximum of 1,100° C. The air-fuel mixture supplied to the combination of the engine and the catalytic converter in this temperature-rise period was slightly fuel-lean (A/F=16.5). The temperature-rise period is followed by a lean-running period (56~60 sec.) wherein the feedback control resumes with respect to the engine with the converter held in the fuel-lean state (A/F=22.0) under continued supply of the secondary air.

(HC-50% Removal Temperature)

After the above-described aging, each of the catalytic converters was supplied with exhaust gas with a constant temperature rise of 30° C./min. while the engine continued to run with stoichiometric air-fuel mixture, and determination was made as to the temperature at which 50% removal was achieved with respect to the hydrocarbons (HC) of the exhaust gas.

In the HC-50% removal evaluation test, the exhaust gas introduced into the catalytic converter at a space velocity of 90,000/h, and the air-fuel mixture supplied to the engine was generally stoichiometric (A/F=14.6) under the feedback control with a fluctuation of ±0.2.

(CO—NO$_x$ Removal Cross Point)

After the above-described aging, each of the catalytic converters was also evaluated with respect to CO—NO$_x$ removal cross point in the following manner.

The engine was run with an air-fuel mixture which continuously varied from a fuel-rich state to a fuel-lean state, and the resulting exhaust gas was introduced into the catalytic converter for removal of harmful gases such as CO and NO$_x$. The removal ratios for CO and NO$_x$, respectively, were measured to determine the CO—NO$_x$ removal cross point at which the CO-removal ratio coincided with the NO$_x$-removal ratio. The CO—NO$_x$ removal cross point thus determined was used for performance evaluation of the catalytic converter.

In the CO—NO$_x$ removal cross point evaluation test, the engine was used without stalling on a car, and the exhaust gas was supplied to the catalytic converter at 460° C. with a space velocity of 90,000/h.

(Results of Evaluation)

Table 1 shows the CO—NO$_x$ removal cross point and the HC-50% removal temperature thus determined for each of the catalytic converters having a mono-layer catalytic coating, whereas Table 2 shows those determined for each of the catalytic converters having a multi-layer catalytic converters. In Tables 1 and 2, the following abbreviations are used.

C—N R.C.P.: CO—NO$_x$ Removal Cross Point
HC-50 R.T.: HC-50% Removal Temperature
Emb.: Embodiment
C.E.: Comparative Example
CZY: $Ce_{0.6}Zr_{0.3}Y_{0.1}$Oxide
ZCLN: $Zr_{0.80}Ce_{0.16}La_{0.02}Nd_{0.02}$Oxide
ZCL: $Zr_{0.7}Ce_{0.2}La_{0.1}$Oxide ZC: $Zr_{0.9}Ce_{0.1}$Oxide
ZCN: $Zr_{0.8}Ce_{0.1}Nd_{0.1}$Oxide
CZY2: $Ce_{0.3}Zr_{0.5}Y_{0.2}$oxide
CZ: $Ce_{0.8}Zr_{0.2}O_2$

TABLE 1

| Sample No. | Catalyst Composition | C-N R.C.P. [%] | HC-50 R.T. [° C.] |
|---|---|---|---|
| Emb. 1 | [Pt(1.0) + Rh(0.7)]/ZCLN(50), Pd(1.5)/CZY(85), $Al_2O_3$(120) | 68 | 350 |
| Emb. 2 | [Pt(1.0) + Rh(0.7)]/ZCLN(50), Pd(1.5)/CZY(85), $Al_2O_3$(120) 1mol-$BaSO_4$ | 91 | 330 |
| C.E. 1 | Pt(1.0), Rh(0.7), Pd(1.5), ZCLN(50), CZY(85), $Al_2O_3$(120) | 66 | 401 |
| C.E. 2 | Pt(1.0), Rh(0.7), Pd(1.5), ZCLN(50), CZY(85), $Al_2O_3$(120) 1mol-Barium Acetate | 70 | 390 |

Notes: (Also Applicable to Table 2)
(1) The number in the parenthesis represents weight in grams.
(2) The slash mark (/) indicates that Pd, Pt and/or Rh are supported on the relevant substance.

TABLE 2

| Sample No. | Catalyst Composition | | C-N R.C.P. [%] | HC-50 R.T. [° C.] |
|---|---|---|---|---|
| | First Layer | Second Layer | | |
| Emb. 3 | Pd(1.5)/CZY(85) $Al_2O_3$ (55) | [Pt(1.0) + Rh(0.7)]/ ZCLN(50) $Al_2O_3$ (65) | 89 | 345 |
| Emb. 4 | Pd(1.5)/CZY(85) $Al_2O_3$ (55), 1mol-$BaSO_4$ | [Pt(1.0) + Rh(0.7)]/ ZCLN(50) $Al_2O_3$ (65) | 92 | 321 |
| Emb. 5 | Pd(1.5)/CZY(35) $Al_2O_3$ (55), 1mol-$BaSO_4$ | [Pt(0.B) + Rh(0.6))/ZCLN(50) [Pt(0.2) + Rh(0.1)]/ CZY(50), $Al_2O_3$ (65) | 95 | 319 |
| Emb. 6 | Pd(1.5)/CZY(35) $Al_2O_3$ (55), 1mol-$BaSO_4$ | [Pt(0.7) + Rh(0.7)]/ZCLN(50) Pt(0.3)/CZY(50), $Al_2O_3$ (65) | 97 | 317 |
| Emb. 7 | Pd(1.5)/CZY(35) $Al_2O_3$ (55), 1mol-$BaSO_4$ | [Pt(1.0) + Rh(0.7)]/ZCLN(50) $Al_2O_3$ (65), CZY(50) | 93 | 320 |
| Emb. 8 | Pd(1.5)/CZY(35) $Al_2O_3$ (55), 1mol-$BaSO_4$ | [Pt(1.0) + Rh(0.7)]/ZCL(50) $Al_2O_3$ (65), CZY(50) | 91 | 326 |
| Emb. 9 | Pd(1.5)/CZY(35) $Al_2O_3$ (55), 1mol-$BaSO_4$ | [Pt(1.0) + Rh(0.7)3/ZC(50) $Al_2O_3$ (65), CZY(50) | 90 | 331 |
| Emb. 10 | Pd(1.5)/CZY2(35) $Al_2O_3$ (55), 1mol-$BaSO_4$ | [Pt(1.0) + Rh(0.7))/ZCLN(50) $Al_2O_3$ (65), CZY2(50) | 80 | 328 |
| Emb. 11 | Pd(1.5)/CZ(35) $Al_2O_3$ (55), 1mol-$BaSO_4$ | [Pt(1.0) + Rh(0.7)]/ZCLN(50) $Al_2O_3$ (65), CZ(50) | 87 | 336 |
| C.E. 3 | Pd(2.5)/$Al_2O_3$ (60) $CeO_2$ (60) | Rh(0.7)/$Al_2O_3$ (20) ZCL(20), $Al_2O_3$ (20) | 76 | 352 |
| C.E. 4 | [Pt(1.0) + Pd(1.5)]/ $Al_2O_3$ (55) CZY(85) | Rh(0.7)/$Al_2O_3$ (65) ZCLN(50) | 81 | 366 |
| C.E. 5 | [Pd(1.5) + Rh(0.7)]/ CZY(35) $Al_2O_3$ (55), 1mol-$BaSO_4$ | Pt(1.0)/ZCLN(50) $Al_2O_3$ (65), CZY2(50) | 83 | 348 |
| C.E. 6 | Pd(1.5)/$CeO_2$ (35) $Al_2O_3$ (55), 1mol-$BaSO_4$ | [Pt(1.0) + Rh(0.7)]/$ZrO_2$ (50) $Al_2O_3$ (65), $CeO_2$ (50) | 67 | 368 |

Conclusion

As appreciated from Table 1 which shows the results with respect to the catalytic converters having a mono-layer catalytic coating, Pd selectively supported on the cerium complex oxide (CZY) and the combination of Pt and Rh selectively supported on the zirconium complex oxide (ZCLN) provide a higher CO—$NO_x$ removal cross point and a lower HC-50% removal temperature (see Embodiments 1 and 2) than achievable when these precious metals are non-selectively supported on the carrier substances (see Comparative Examples 1 and 2). In particular, the additional inclusion of barium sulfate in the catalytic coating provides excellent results due to its poisoning-preventive effect (Embodiment 2).

With regard to the catalytic converters having a multi-layer catalytic coating, Table 2 shows that better results are obtainable both with respect to CO—$NO_x$ removal cross point and HC-50% removal temperature when Pd is selectively supported on a cerium complex oxide in the first coating layer while the combination of Pt and Rh is selectively supported on a zirconium complex oxide (Compare Embodiments 3~11 with Comparative Examples 3~6). In particular, comparison of Embodiments 3~11 with Comparative Example 6 demonstrates that Pd should be supported on a cerium complex oxide rather than pure ceria, whereas the combination of Pt and Rh should be supported on a zirconium complex oxide rather than pure zirconia.

Further, comparison of Embodiments 3 and 4 teaches the effectiveness of barium sulfate for preventing HC-poisoning in the first coating layer, whereas Comparative Examples D and E indicate that Pd should not be accompanied by other precious metal.

Moreover, Embodiments 5 and 6 indicate that the exhaust gas cleaning performance of the catalytic converter will be additionally enhanced by the inclusion of Pt- and/or Rh-supporting cerium complex oxide in the second coating layer in addition to the Pt- & Rh-supporting zirconium complex oxide.

In conclusion, therefore, a catalytic converter according to the present invention may be advantageously incorporated in an intake manifold to provide a good catalytic activity promptly after an engine start and for a long time even at high temperature.

What is claimed is:

1. A catalytic converter for cleaning exhaust gas comprising:
   a heat-resistant support; and
   a catalytic coating formed on the heat-resistant support;
   wherein the catalytic coating comprises: particles of a cerium complex oxide; Pd carried on the cerium complex oxide particles; particles of zirconium complex oxide; a combination of Pt and Rh coexistently carried on the zirconium complex oxide particles; and particles of a heat-resistant inorganic oxide;
   wherein the cerium complex oxide is represented by the following formula,

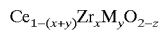
   $$Ce_{1-(x+y)}Zr_xM_yO_{2-z}$$

where "M" represents at least one element selected from a group consisting of Y, La, Nd, Yb, Mg and Ca, "z" represents the degree of oxygen deficiency determined by the valence and content of the contained element M, $0.2 \leq x+y \leq 0.7$, $0.2 \leq x \leq 0.7$, and $0 \leq y \leq 0.2$; and
   wherein the zirconium complex oxide is a mixed metal oxide containing at least zirconium and cerium, the zirconium complex oxide containing zirconium in a higher proportion than cerium, the zirconium complex oxide falling outside the definition for the cerium complex oxide.

2. The catalytic converter of claim 1, wherein the catalytic coating further contains at least one sulfate which prevents Pd from being poisoned with hydrocarbons contained in the exhaust gas.

3. The catalytic converter of claim 2, wherein the sulfate is selected from a group consisting of barium sulfate, calcium sulfate, strontium sulfate, cesium sulfate, potassium sulfate, magnesium sulfate, yttrium sulfate, and lanthanum sulfate.

4. The catalytic converter of claim 1, wherein the catalytic coating includes a first coating layer which is formed on the heat-resistant support and contains the Pd-carrying cerium complex oxide particles, and a second coating layer which is formed on the first coating layer and contains the Pt- and Rh-carrying zirconium complex oxide particles.

5. The catalytic converter of claim 4, wherein the first coating layer contains at least one sulfate which prevents Pd from being poisoned with hydrocarbons contained in the exhaust gas.

6. The catalytic converter of claim 5, wherein the sulfate is selected from the group consisting of barium sulfate, calcium sulfate, strontium sulfate, cesium sulfate, potassium sulfate, magnesium sulfate, yttrium sulfate, and lanthanum sulfate.

7. The catalytic converter of claim 4, wherein the second coating layer further contains particles of a cerium complex oxide supporting at least one of Pt and Rh.

8. The catalytic converter of claim 1, wherein the cerium complex oxide meets the relations $0.3 \leq x+y \leq 0.6$, $0.2 \leq x \leq 0.5$, and $0.03 \leq y \leq 0.12$ in said formula.

9. The catalytic converter of claim 1, wherein at least part of the cerium complex oxide is solid solution.

10. The catalytic converter of claim 1, wherein the heat-resistant inorganic oxide is selected from a group consisting of alumina, silica, titania and magnesia.

11. The catalytic converter of claim 1, wherein the heat-resistant support has a honeycomb structure.

12. A catalytic converter for cleaning exhaust gas comprising:
    a heat-resistant support; and
    a catalytic coating formed on the heat-resistant support;
    wherein the catalytic coating comprises Pd-carrying particles of a cerium complex oxide, particles of a heat-resistant inorganic oxide, and at least one sulfate which prevents Pd from being poisoned with hydrocarbons contained in the exhaust gas.

13. The catalytic converter of claim 12, wherein the sulfate is selected from the group consisting of barium sulfate, calcium sulfate, strontium sulfate, cesium sulfate, potassium sulfate, magnesium sulfate, yttrium sulfate, and lanthanum sulfate.

14. A catalytic converter for cleaning exhaust gas comprising:
    a heat-resistant support; and
    a catalytic coating formed on the heat-resistant support;
    wherein the catalytic coating comprises: particles of a cerium complex oxide; Pd carried on the cerium complex oxide particles; particles of zirconium complex oxide; a combination of Pt and Rh coexistently carried on the zirconium complex oxide particles; and particles of a heat-resistant inorganic oxide;
    wherein the cerium complex oxide is represented by the following formula, $$Ce_{1-(x+y)}Zr_xM_yO_{2-z}$$

where "M" represents at least one element selected from a group consisting of Y, La, Nd, Yb, Mg and Ca, "z" represents the degree of oxygen deficiency determined by the valence and content of the contained element M, 0.2 x+y 0.7, 0.2×0.7, and 0 y 0.2;
    wherein the zirconium complex oxide is a mixed metal oxide containing at least zirconium in a proportion of 0.7–0.9 and cerium in a proportion of 0.1–0.2.

* * * * *